(12) United States Patent
Reid et al.

(10) Patent No.: US 11,027,378 B2
(45) Date of Patent: Jun. 8, 2021

(54) SYSTEM AND METHOD FOR ASSEMBLY MANUFACTURING

(71) Applicant: The Boeing Company, Chicago, IL (US)

(72) Inventors: Eric M. Reid, Kenmore, WA (US); Matthew R. Desjardien, Kenmore, WA (US); Edward J. Batt, Bothell, WA (US); Antonio C. Micale, Seattle, WA (US)

(73) Assignee: The Boeing Company, Chicago, IL (US)

(*) Notice: Subject to any disclaimer, the term of this patent is extended or adjusted under 35 U.S.C. 154(b) by 219 days.

(21) Appl. No.: 16/264,980

(22) Filed: Feb. 1, 2019

(65) Prior Publication Data

US 2019/0160610 A1 May 30, 2019

Related U.S. Application Data

(62) Division of application No. 15/244,194, filed on Aug. 23, 2016, now Pat. No. 10,272,530, which is a
(Continued)

(51) Int. Cl.
*B64F 5/00* (2017.01)
*B23P 21/00* (2006.01)
(Continued)

(52) U.S. Cl.
CPC ........... *B23P 21/004* (2013.01); *B21J 15/142* (2013.01); *B25J 5/02* (2013.01); *B25J 9/1687* (2013.01);
(Continued)

(58) Field of Classification Search
CPC . B23P 21/004; B23P 2700/50; B23P 2700/01; B64F 5/50; B64F 5/10;
(Continued)

(56) References Cited

U.S. PATENT DOCUMENTS 5,560,102 A * 10/1996 Micale ..................... B64F 5/10
29/897.2
5,604,974 A 2/1997 Birke et al.
(Continued)

FOREIGN PATENT DOCUMENTS

FR 2 712 833 6/1995
JP S56 146638 11/1981
(Continued)

OTHER PUBLICATIONS

Japan Patent Office, "Notice of Reasons for Rejection," with English translation, App. No. 2015-051994 (dated Jul. 2, 2019).
(Continued)

*Primary Examiner* — Jun S Yoo
(74) *Attorney, Agent, or Firm* — Walters & Wasylyna

(57) ABSTRACT

A method for assembly manufacturing including positioning a workpiece in an assembly position within an operational cell, positioning a fastening machine relative to the workpiece, wherein the fastening machine includes a robot frame comprising a throat, an assembly end effector coupled to the frame about the throat, and a plurality of linear actuators coupled to the frame, moving, by the plurality of linear actuators, the fastening machine about at least one of six degrees of freedom to receive at least a portion of the workpiece within the throat and position the assembly end effector relative to the workpiece, and performing, by the fastening machine, a fastening operation on the workpiece.

20 Claims, 11 Drawing Sheets

Related U.S. Application Data division of application No. 14/222,878, filed on Mar. 24, 2014, now Pat. No. 9,452,500.

(51) Int. Cl.

| | | |
|---|---|---|
| *B25J 5/02* | (2006.01) | |
| *B25J 11/00* | (2006.01) | |
| *B21J 15/14* | (2006.01) | |
| *B64F 5/10* | (2017.01) | |
| *B64F 5/50* | (2017.01) | |
| *B25J 9/16* | (2006.01) | |

(52) U.S. Cl.
CPC .............. *B25J 11/00* (2013.01); *B64F 5/10* (2017.01); *B64F 5/50* (2017.01); *B23P 2700/01* (2013.01); *B23P 2700/50* (2013.01); *Y10S 901/02* (2013.01); *Y10T 29/49829* (2015.01); *Y10T 29/49947* (2015.01); *Y10T 29/49956* (2015.01); *Y10T 29/53417* (2015.01)

(58) Field of Classification Search
CPC ... B25J 9/1687; B25J 11/00; B25J 5/02; B21J 15/142; Y10T 29/49947; Y10T 29/53417; Y10S 901/02
See application file for complete search history.

(56) References Cited

U.S. PATENT DOCUMENTS

| | | | |
|---|---|---|---|
| 6,092,275 A * | 7/2000 | Kellner | G05B 19/41815 29/525.06 |
| 6,360,421 B1 | 3/2002 | Oatridge et al. | |
| 8,220,134 B2 | 7/2012 | Burns et al. | |
| 8,661,684 B1 | 3/2014 | Boyd et al. | |
| 2004/0093731 A1* | 5/2004 | Sarh | B21J 15/10 29/897.3 |
| 2005/0036879 A1* | 2/2005 | Jhaveri | B25J 9/1682 414/751.1 |
| 2006/0185143 A1 | 8/2006 | Frauen et al. | |
| 2009/0234488 A1* | 9/2009 | Kilibarda | B62D 65/02 700/117 |
| 2012/0011693 A1* | 1/2012 | Amirehteshami | B21J 15/142 29/428 |
| 2012/0312862 A1* | 12/2012 | Landoll | B23K 37/0235 228/7 |
| 2015/0020365 A1* | 1/2015 | Valasek | F16M 1/00 29/428 |

FOREIGN PATENT DOCUMENTS

| | | |
|---|---|---|
| JP | 2001-300795 | 10/2001 |
| JP | 2006-159332 | 6/2006 |
| JP | 2007 203340 | 8/2007 |
| WO | WO 2005/105389 | 11/2013 |
| WO | WO 2013/168119 | 11/2013 |
| WO | WO 2014/051868 | 4/2014 |

OTHER PUBLICATIONS

Japan Patent Office, "Notice of Reasons for Rejection," with English translation, App. No. 2015-051994 (dated Jan. 29, 2019).
English abstract of JP 2001-300795.
English abstract of JP 2006-159332.

* cited by examiner

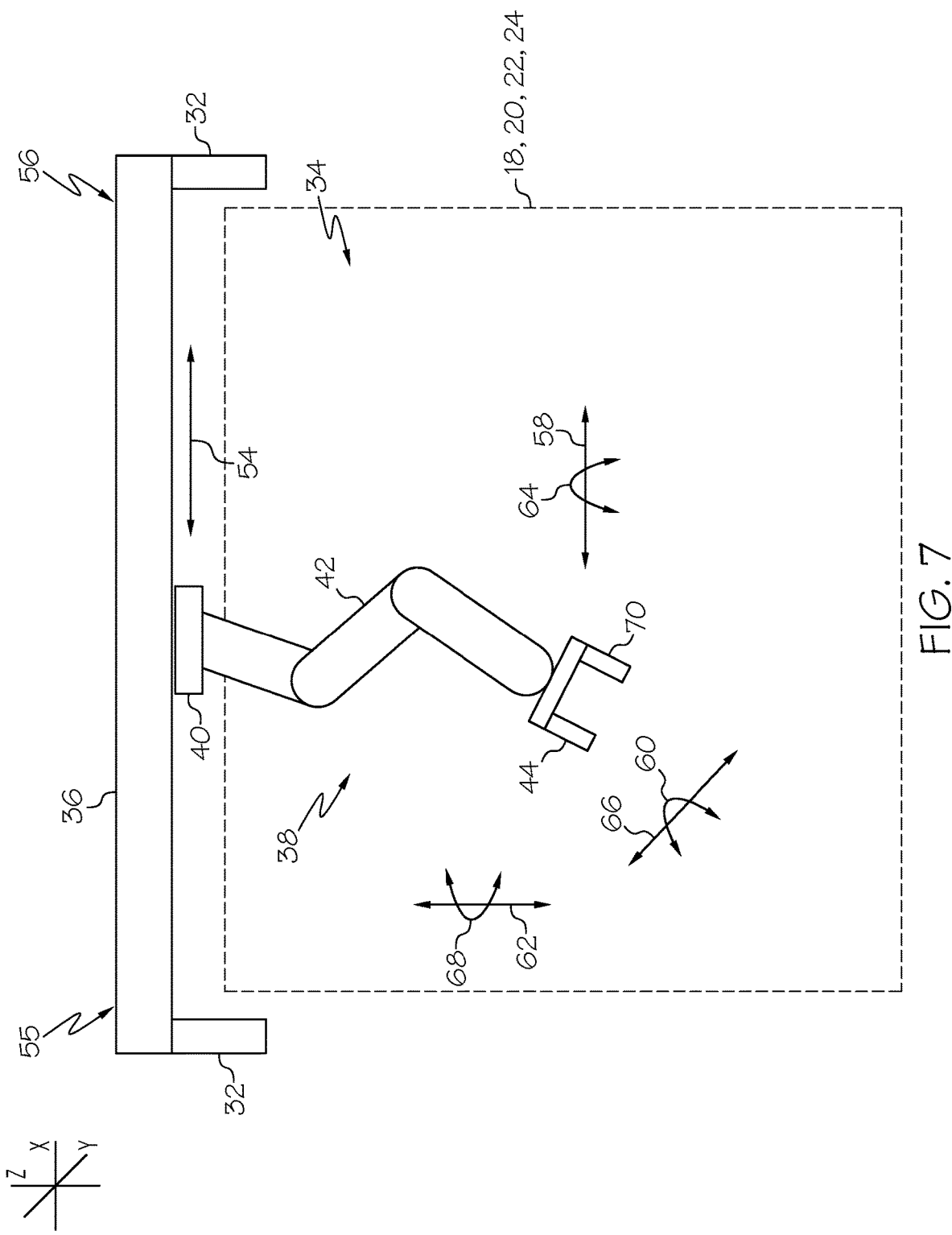

SYSTEM AND METHOD FOR ASSEMBLY MANUFACTURING

PRIORITY

This application is a divisional of U.S. Ser. No. 15/244,194 filed on Aug. 23, 2016, which is a divisional of U.S. Ser. No. 14/222,878 filed on Mar. 24, 2014.

FIELD

The present disclosure is generally related to assembly manufacturing and, more particularly, to a system and method for assembly manufacturing of a large structural workpiece.

BACKGROUND

A number of manufacturing applications exist in which large structural workpieces are assembled and, in many cases, joined to form a final structure. For example, large monument machine tools and tooling may be used for assembling large workpieces, such as large panels used for assembling wing planks, wing panels or wing assemblies of aircraft. However, traditional systems have been barriers to attaining a more efficient manufacturing process.

For example, current manufacturing processes for large, structural workpieces feature large, floor-mounted machine tools and expensive tooling. The size of the assembly machines is a result of requirements for throat depth and the multiple custom axes for reaching all surfaces of the workpiece. These monument machines and tooling utilize excessive floor space and cannot be reconfigured between different types of structural workpieces. Furthermore, moving large workpieces, for example, by crane may be time-consuming and may create a bottleneck in the manufacturing process. Such delays may leave machine tools idled during material handling and set-up. Additionally, the traditional manufacturing is highly dependent on manual processes, such as fastening workpieces during the assembly process.

Accordingly, those skilled in the art continue with research and development efforts in the field of assembly manufacturing.

SUMMARY

In one embodiment, the disclosed method for assembly manufacturing may include the steps of: (1) positioning, by a material-handling system, an unassembled workpiece in a first assembly position within a tacking cell, (2) performing, by a first plurality of fastening machines, a tack fastening operation on the unassembled workpiece to form a partially assembled workpiece, (3) transferring, by the material-handling system, the partially assembled workpiece from the tacking cell to a fastening cell, (4) positioning, by the material-handling system, the partially assembled workpiece in a second assembly position within the fastening cell, and (5) performing, by a second plurality of fastening machines, a final fastening operation on the partially assembled workpiece to form an assembled workpiece.

In another embodiment, the disclosed method for assembly manufacturing may include the steps of: (1) positioning a workpiece in an assembly position within an operational cell, (2) positioning a fastening machine relative to the workpiece, wherein the fastening machine may include a robot frame including a throat, an assembly end effector coupled to the frame about the throat, and a plurality of linear actuators coupled to the frame, (3) moving, by the plurality of linear actuators, the fastening machine about at least one of six degrees of freedom to receive at least a portion of the workpiece within the throat and position the assembly end effector relative to the workpiece, and (4) performing, by the fastening machine, a fastening operation on the workpiece.

Other embodiments of the disclosed system and method for assembly manufacturing will become apparent from the following detailed description, the accompanying drawings and the appended claims.

BRIEF DESCRIPTION OF THE DRAWINGS

FIG. 7 is a schematic illustration of one embodiment of the robotic assembly of the disclosed system;

DETAILED DESCRIPTION

Figure 1:
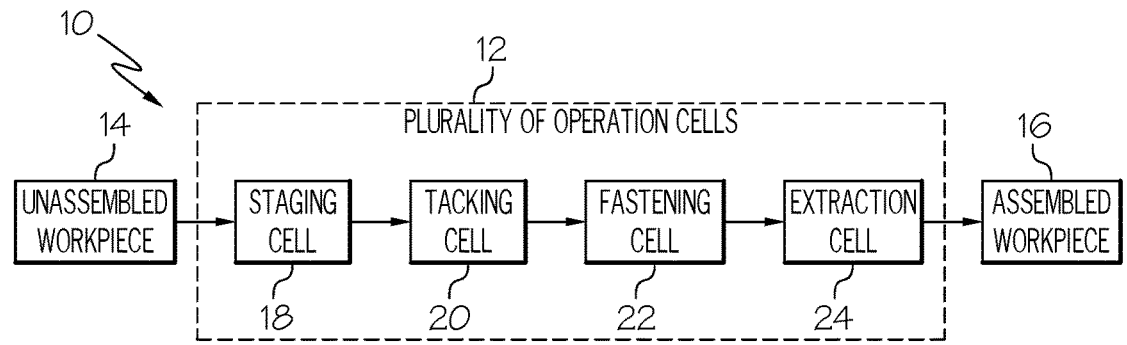
FIG. 1 is a block diagram of one embodiment of the disclosed system for assembly manufacturing.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Referring to FIG. 1, one embodiment of the disclosed system, generally designated 10, for assembly manufacturing may include a plurality of functional operation cells 12. In one example of an assembly manufacture operation, the plurality of operation cells 12 may assembly a workpiece in an unassembled condition 14 (referred to generally as unassembled workpiece 14) into a workpiece in an assembled condition 16 (referred to generally as an assembled workpiece 16).

In one embodiment, the plurality of operation cells 12 may include at least one staging cell 18, at least one tacking cell 20, at least one fastening cell 22 and at least one extraction cell 24. The plurality of operation cells 12, in combination, may acquire the unassembled workpiece 14, perform one or more assembly operations to assemble the unassembled workpiece 14 into the assembled workpiece 16 and yield the assembled workpiece 16. In one example implementation, the plurality of operation cells 12 may be utilized for assembly manufacture of large-scale structural panels, such as those typical to a commercial aircraft including, but not limited to, wing skin planks, wing skin panels, fuselage body side panels or wing assemblies.

In a specific, non-limiting aerospace example, the unassembled workpiece 14 may include a plurality of stringers and at least one skin section and the assembled workpiece 16 may include a wing plank. For example, the plurality of stringers and at least one skin section (e.g., the unassembled workpiece 14) may be transported to the staging cell 18. The plurality of stringers and at least one skin section may be positioned at an appropriate initial fastening position within the tacking cell 20. For example, the skin section may be positioned in a generally horizontal position and each stringer of the plurality of stringers may be positioned in a fastening position on the skin section. The tacking cell 20 may perform one or more machining and/or assembly operations on the plurality of stringers and the skin section to initially fasten the plurality of stringers to the skin section. A partially assembled plurality of stringers and skin section may be positioned at an appropriate final fastening position within the fastening cell 22. The fastening cell 22 may perform one or more machining and/or assembly operations on the plurality of stringers and the skin section to finally fasten the plurality of stringers to the skin section. For example, the partially assembled plurality of stringers and skin section may be positioned in a generally horizontal position and each stringer of the plurality of stringers may be finally fastened to the skin section. A fully assembled plurality of stringers and skin section may then be positioned within the extraction cell 24 for removal of the fully assembled plurality of stringers and skin section (e.g., the assembled workpiece 16).

In another specific, non-limiting aerospace example, the unassembled workpiece 14 may include at least two wing planks and at least one splice stringer and/or at least one side of body and the assembled workpiece 16 may include a wing assembly. For example, the at least two wing planks and at least one splice stringer and/or at least one side of body (e.g., unassembled workpiece 14) may be transported to the staging cell 18. The at least two wing planks may be positioned at an appropriate initial fastening position within the tacking cell 20. For example, the wing planks may be positioned in a generally horizontal position and at least one splice stringer and/or at least one side of body may be positioned in a fastening position on the wing planks (e.g., between edge interfaces of the wing planks). The tacking cell 20 may perform one or more machining and/or assembly operations on the at least two wing planks and at least one splice stringer and/or at least one side of body to initially fasten the splice stringer and/or side of body to the wing planks. A partially assembled wing planks, splice stringer and/or side of body may be positioned at an appropriate final fastening position within the fastening cell 22. The fastening cell 22 may perform one or more machining and/or assembly operations on the partially assembled wing planks, splice stringer and/or side of body may to finally fasten the splice stringer and/or side of body to the wing planks. For example, the partially assembled wing planks, splice stringer and/or side of body may be positioned in a generally horizontal position and the splice stringer and/or side of body may be finally fastened to the wing planks. A fully assembled partially assembled wing planks, splice stringer and/or side of body may then be positioned within the extraction cell 24 for removal of the fully assembled partially assembled wing planks, splice stringer and/or side of body (e.g., the assembled workpiece 16).

Figure 2:
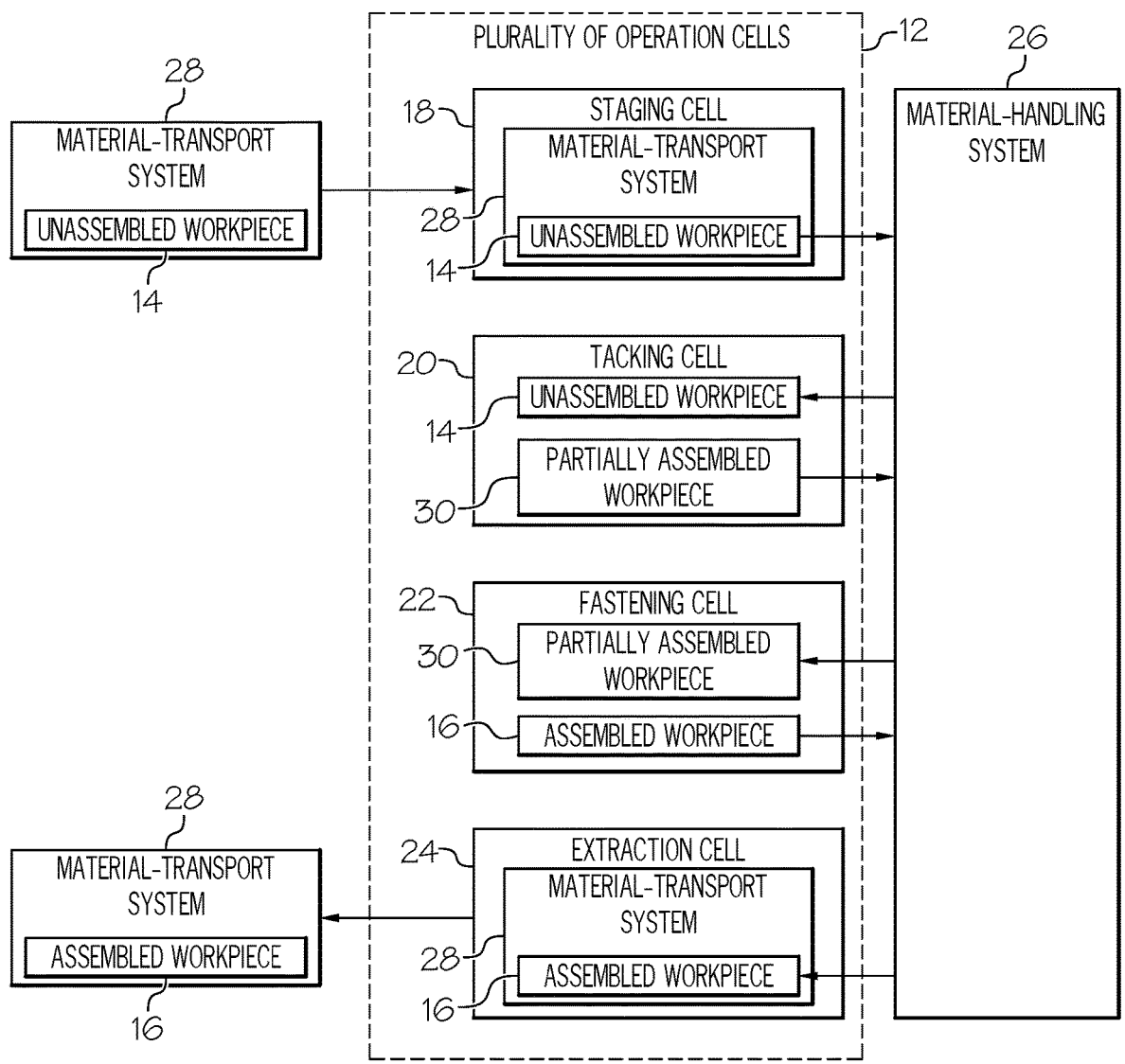
FIG. 2 is a block diagram of another embodiment of the disclosed system.

Referring to FIG. 2, in another embodiment, the plurality of operation cells 12 may be linked together by a common material-handling system 26. In another example of an assembly manufacture operation, a material-transport system 28 may be loaded with the unassembled workpiece 14 and deliver the unassembled materials to the staging cell 18. The material-handling system 26 may remove the unassembled workpiece 14 from the material-transport system 28 and position the unassembled workpiece 14 in the tacking cell 20. The tacking cell 20 may perform at least one assembly operation on the unassembled workpiece 14 to form a partially assembled workpiece 30. The material-handling system 26 may remove the partially assembled workpiece 30 from the tacking cell 20 and position the partially assembled workpiece 30 in the fastening cell 22. The fastening cell 22 may perform at least one assembly operation on the partially assembled workpiece 30 to form the assembled workpiece 16. The material-handling system 26 may remove the assembled workpiece 16 from the fastening cell 22 and move the assembled workpiece 16 to the extraction cell 24 where the assembled workpiece 16 may be positioned on the material-transport system 28 for transport to another location.

Figure 3:
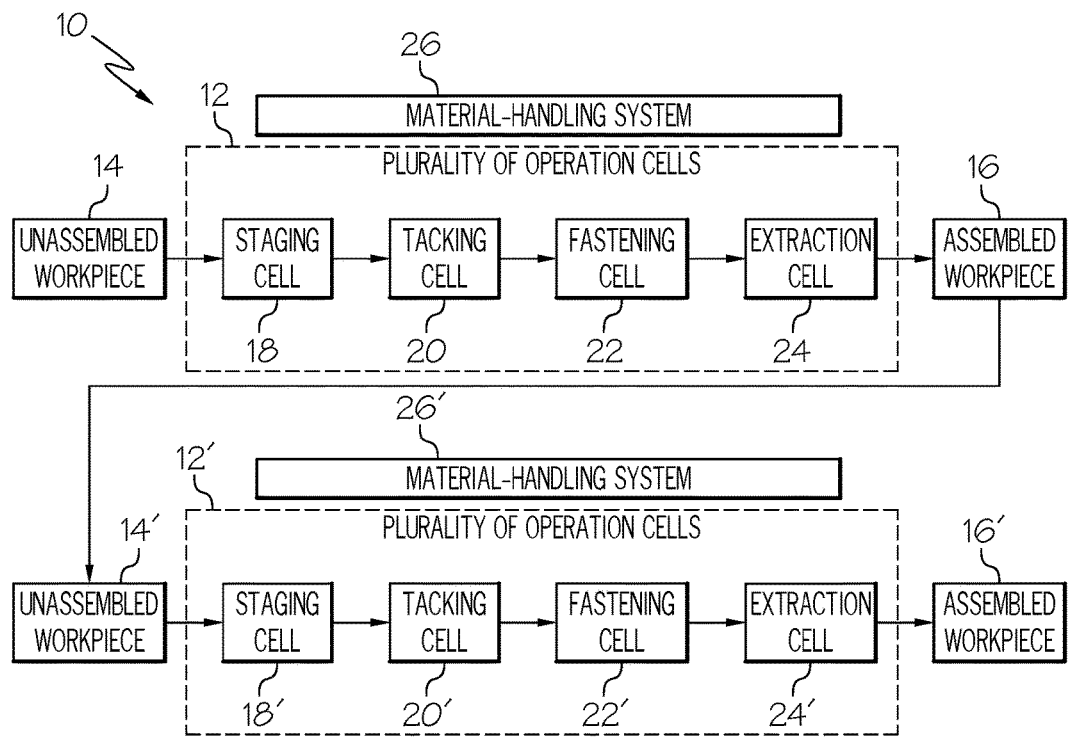
FIG. 3 is a block diagram of another embodiment of the disclosed system.

Referring to FIG. 3, in another embodiment, a plurality of operation cells 12' may be linked to the plurality of operation cells 12. The assembled workpiece 16 may become unassembled workpiece 14', which are delivered (e.g., via the material-transport system 28) to the plurality of operation cells 12'. The plurality of operation cells 12' may include at least one staging cell 18', at least one tacking cell 20', at least one fastening cell 22' and at least one extraction cell 24'. The plurality of operation cells 12' may be linked together by a common material-handling system 26'. The plurality of operation cells 12' may perform one or more assembly operations on the unassembled workpiece 14' to assemble an assembled workpiece 16'. Those skilled in the art will recognize that additional pluralities of operation cells may be linked as many times as necessary to assembly manufacture a final assembled workpiece.

Figure 4:
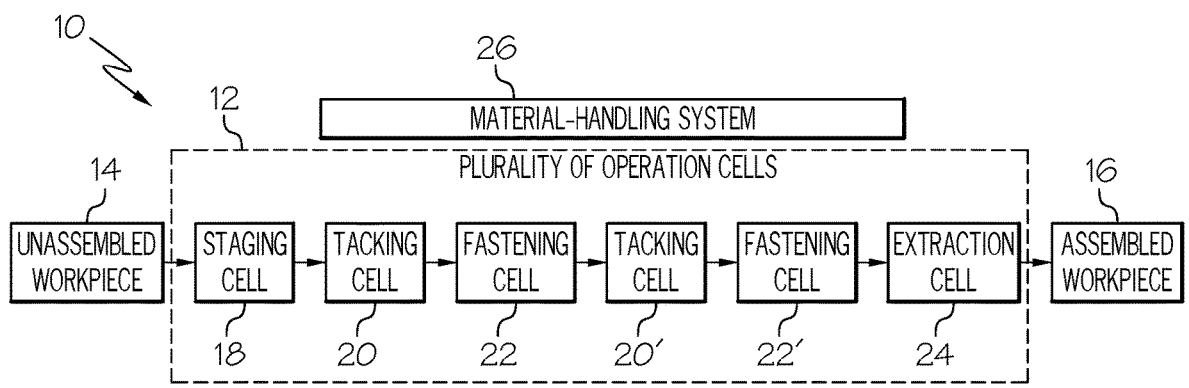
FIG. 4 is a block diagram of another embodiment of the disclosed system.

Referring to FIG. 4, in another embodiment, the plurality of operation cells 12 may include at least one staging cell 18, at least one tacking cell 20, at least one fastening cell 22, at least one tacking cell 20', at least one fastening cell 22' and at least one extraction cell 24. The plurality of operation cells 12 may be linked together by a common material-handling system 26. The plurality of operation cells 12 may perform one or more assembly operations on the unassembled workpiece 14 to assemble an assembled workpiece 16. Those skilled in the art will recognize that additional tacking cells and/or additional fastening cells may be included in the plurality of operation cells 12 as necessary to assembly manufacture a final assembled workpiece.

As will be described in more detail herein, in yet another embodiment (not shown), the staging cell 18 and/or the extraction cell 24 may be eliminated from the plurality of operation cells 12, depending upon the manner in which the unassembled workpiece 14 are loaded into the tacking cell 20 and/or how the assembled workpiece 16 is unloaded from the fastening cell 22.

Figure 5:
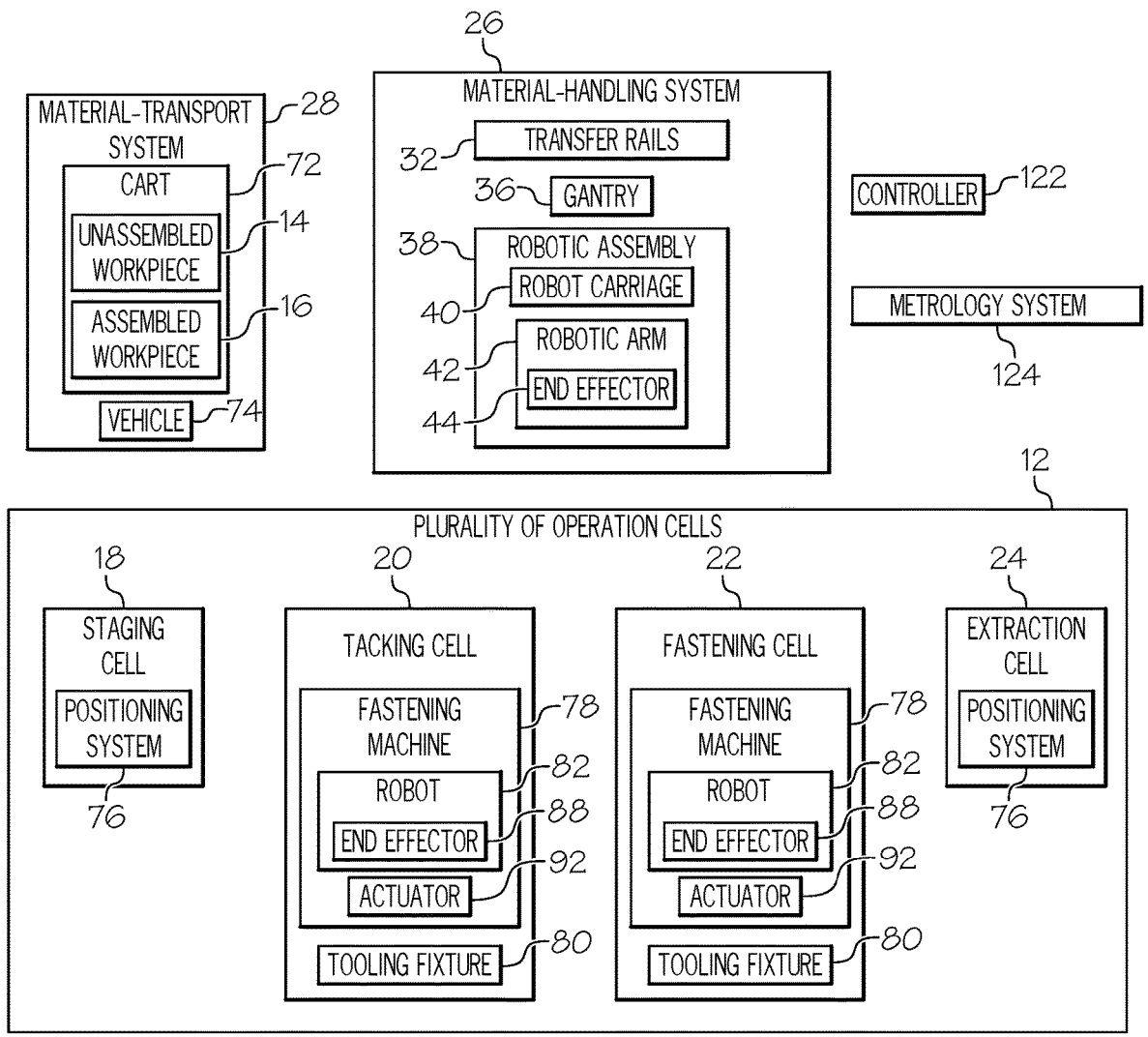
FIG. 5 is a block diagram of another embodiment of the disclosed system.
Figure 6:
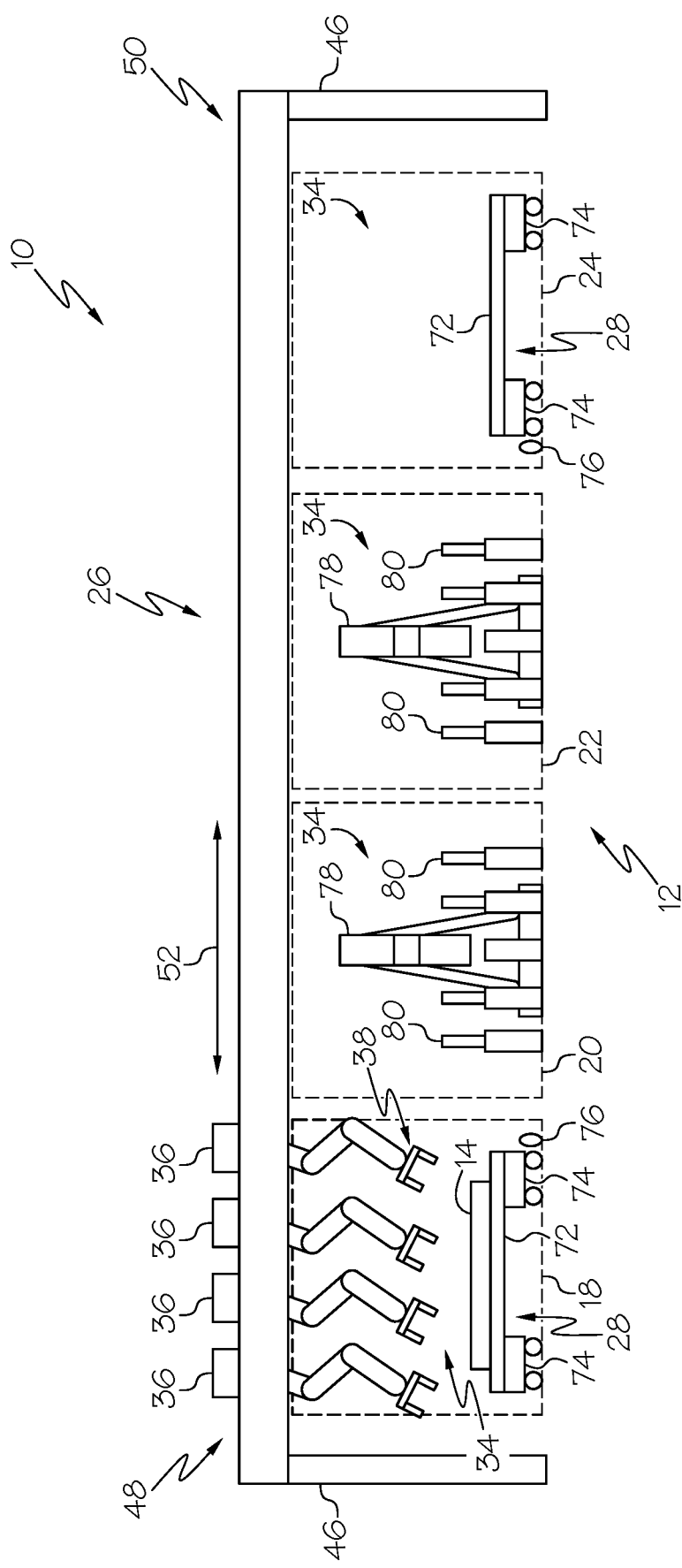
FIG. 6 is a schematic illustration of one embodiment of the material-handling system of the disclosed system.

Referring to FIGS. 5 and 6, in an example embodiment, the plurality of operation cells 12 (e.g., at least one staging cell 18, at least one tacking cell 20, at least one fastening cell 22 and/or at least one extraction cell 24) may be arranged in a linear configuration (e.g., an assembly line). The material-handling system 26 may include a pair of transfer rails 32 (only a single transfer rail 32 is shown in FIG. 6). The transfer rails 32 may extend substantially the entire length of the plurality of operation cells 12. For example, the transfer rails 32 may extend longitudinally from the first cell (e.g., the staging cell 18 in FIG. 6) to the last cell (e.g., the extraction cell 24 in FIG. 6) of the plurality of operation cells 12. The transfer rails 32 may be positioned above (e.g., overhead transfer rails) the plurality of operation cells 12. For example, the transfer rails 32 may be positioned above a functional operation area 34 (e.g., the area where one or more assembly operations is performed) of each of the plurality of operation cells 12.

In an example construction, the transfer rails 32 may be supported in a substantially horizontal position by a plurality of substantially vertical support stanchions 46. In another example construction, the transfer rails 32 may be connected to and extend between opposing structures, such as walls or structural support beams of a manufacturing facility.

In an example construction, at least one gantry 36 (a plurality of gantries 36 are shown in FIG. 6) may be operably connected between the pair of transfer rails 32. The transfer rails 32 may be spaced apart laterally, for example, to the outside of the plurality of operation cells 12 (FIG. 7). Each gantry 36 may include at least one robotic assembly 38. The gantry 36 may be linearly movable along the pair of transfer rails 32, for example, in the direction of arrow 52. The gantry 36 may longitudinally traverse the pair of transfer rails 32 to position the robotic assembly 38 over any one of the plurality of operation cells 12 (e.g., within the functional operation area 34 of each of the plurality of operation cells 12). For example, the gantry 36 (or the plurality of gantries 36) may traverse the pair of transfer rails 32 from proximate a first end 48 to proximate a second end 50.

The gantry 36 may be driven upon the pair of transfer rails 32 by any suitable driving system (not shown) including, but not limited to, a mechanical driving system, an electromechanical driving system, a hydraulic driving system, a pneumatic driving system or the like. In a specific, non-limiting example, the gantry 36 may be driven by and/or the relative position of the gantry 36 with respect to each of the plurality of cells 12 may be controlled by one or more servomechanisms.

Referring to FIG. 7, the robotic assembly 38 may include a robot carriage 40 operably connected to an underside of the gantry 36 (e.g., above the functional operation area 34). A robotic arm 42 may be operably connected to the robot carriage 40. The robot carriage 40 may be linearly movable along the gantry 36, for example, in the direction of arrow 54. The robot carriage 40 may traverse a substantial length of the gantry 36 (e.g., between laterally opposed transfer rails 32) to position the robotic arm 42 at any one of a plurality of predetermined positions within the functional operation area 34 of each of the plurality of operation cells 12 (e.g., the staging cell 18, the tacking cell 20, the fastening cell 22 and/or the extraction cell 24). For example, the robot carriage 40 may traverse the gantry 36 from proximate a first end 55 to proximate a second end 56.

The robot carriage 40 may be driven upon the gantry 36 by any suitable driving system (not shown) including, but not limited to, a mechanical driving system, an electromechanical driving system, a hydraulic driving system, a pneumatic driving system or the like. In a specific, non-limiting example, the robot carriage 40 may be driven by and/or the relative position of the robot carriage 40 with respect to each of the plurality of cells 12 may be controlled by one or more servomechanisms.

The robot carriage 40 and the robotic arm 42 may include any robotic assembly suitable for assembly manufacturing operations. In a specific, non-limiting example, the robot carriage 40 and/or the robotic arm 42 may be an industrial robot platform, such as commercially available from KUKA Robotics Corporation of Gersthofen, Germany An end effector 44 may be disposed at an end of the robotic arm 42. The robotic arm 42 may include one or more independently articulating arm segments to position the end effector 44 at any one of a plurality of predetermined positions within the functional operation area 34 of each of the plurality of operation cells 12. The robotic arm 42 may be configured to move and/or position the end effector 44 at any location, for example, in the direction of arrow 58 (e.g., along the X-axis), arrow 60 (e.g., along the Y-axis) and/or arrow 62 (e.g., along the Z-axis). The robotic arm 42 may be configured to rotate and/or position the end effector 44 at any location, for example, in the direction of arrow 64 (e.g., about the X-axis), arrow 66 (e.g., about the Y-axis) and/or arrow 68 (e.g., about the Z-axis). In a specific, non-limiting example, the robotic arm 42 and/or the end effector 44 may be driven by and/or the relative position of the robotic arm 42 and/or end effector 44 with respect to each of the plurality of cells 12 may be controlled by one or more servomechanisms.

Thus, the robotic arm 42 may provide the end effector 44 with of freedom of movement along six axes (e.g., along the X-, Y- and/or Z-axis and about the X-, Y- and/or Z-axis) and the robot carriage 40 may provide freedom of movement (e.g., linear movement) along a seventh axis (e.g., along the X-axis).

The end effector 44 of each robotic arm 42 may be customized to grip, handle, carry and/or manipulate the unassembled workpiece 14. For example, the end effector 44 may include any suitable mechanism 70 configured to grip or clamp a specific type of unassembled material 14 (e.g., individual pieces of the unassembled workpiece 14). In following with the aerospace example above, one or more end effectors 44 of one or more robotic assemblies 38 may be configured to grip a skin section, a stringer, a wing plank, a splice stringer and/or a side of body component.

In another example construction, the material-handling system 26 may include a monorail system or similar overhead handling system (not shown). For example, the transfer rails 32 (FIG. 5) may be configured as a cantilever system (not shown), for example, extending from a wall or a support beam. The cantilever system may include a plurality of cantilever beams (not shown) positioned above each operation cell 12 of the plurality of operation cells 12 (e.g., the staging cell 18, the tacking cell 20, the fastening cell 22 and/or the extraction cell 24). One or more robotic assemblies 38 (FIG. 5) may be operably connected to an underside of each cantilever beam of the cantilever system (e.g., above the functional operation area 34). The robotic assembly 38 may be linearly movable along the cantilever beam, for example, by the robot carriage 40. For example, the robot carriage 40 may traverse a substantial length of the cantilever beam to position the robotic arm 42 of the robotic assembly 38 at any one of a plurality of predetermined positions within the functional operation area 34 of a respective operation cell 12 (e.g., the staging cell 18, the tacking cell 20, the fastening cell 22 and/or the extraction cell 24).

Referring to FIGS. 8A, 8B, 8C and 8D, in an example assembly manufacturing operation, the material-handling system 26 may engage, transfer and/or position the unassembled workpiece 14, the partially assembled workpiece 30 (FIG. 2) and/or the assembled workpiece 16 (FIG. 2) from and between the plurality of operation cells 12. In an example implementation, the material-handling system 26 may utilize repeatable machine positioning and machine accuracy to engage and place the workpiece (e.g., the unassembled workpiece 14, the partially assembled workpiece 30 and/or the assembled workpiece 16) at appropriate positioned between and within the plurality of operation cells 12. In another example implementation, the material-handling system 26 may utilize one or more metrology systems 124 (e.g., laser tracking, laser radar, Intelligent Global Pooling Systems (iGPS), RFID tracking and the like) to provide for appropriate positioning of the workpiece between and within the plurality of operation cells 12.

Figure 8A:
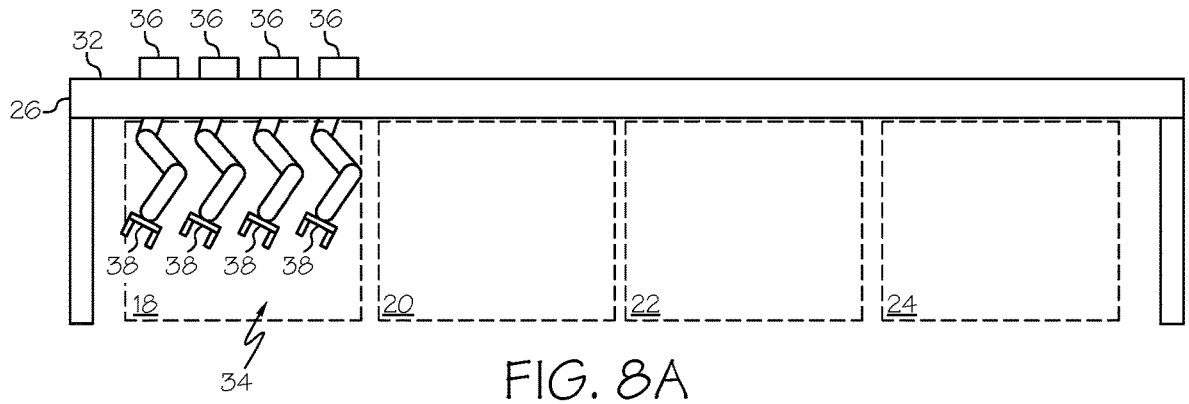
FIGS. 8A, 8B, 8C and 8D are schematic illustration depicting the operational positions of the material handling system.
Figure 8B:
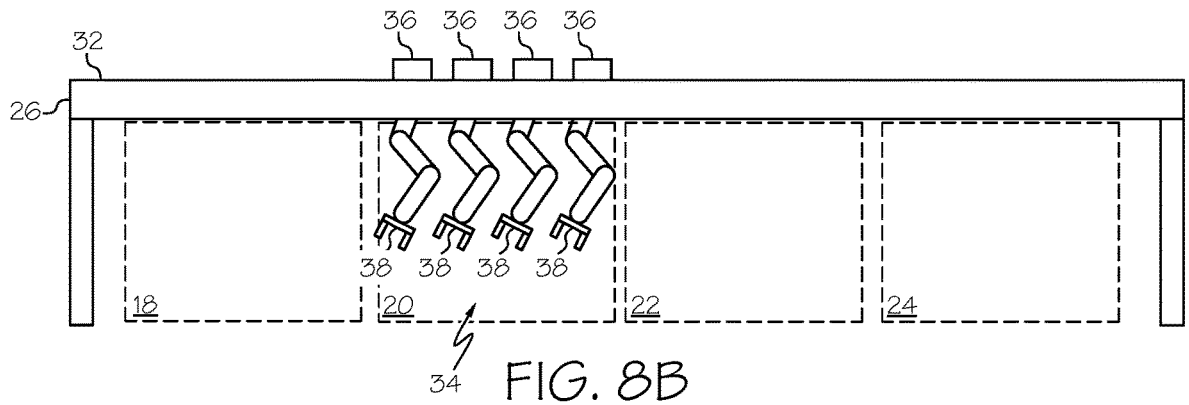

For example, the gantries 36 may initially be positioned in a first position (e.g., positioning the robotic assemblies 38 within the functional operational area 34 of the staging cell 18), as illustrated in FIG. 8A. The unassembled workpiece 14 (FIG. 6) may be positioned within the functional operation area 34 of the staging cell 18, for example, by the material-transport system 28 (FIG. 6). The robotic assemblies 38 may engage (e.g., grip and lift) a first component of the unassembled workpiece 14 while in the first position. The gantry 36 may move to a second position (e.g., positioning the robotic assemblies 38 within the function work area 34 of the tacking cell 20), as illustrated in FIG. 8B. The robotic assemblies 38 may transfer the first component of the unassembled material 14 to an assembly position within the tacking cell 20.

The gantries 36 may return to the first position and the robotic assemblies 38 may engage a second component of the unassembled material 14 while in the first position. The gantries 36 may move to the second position and the robotic assemblies 38 may transfer the second component of the unassembled material 14 to an assembly position with respect to the first material within the tacking cell 20. This process may be repeated until all of the components of the unassembled workpiece 14 are positioned at an appropriate assembly position within the tacking cell 20.

As another example, the robotic assemblies 38 may be positioned along the cantilever system, as described above, within the functional operation area 34 to engage (e.g., grip, lift and/or transfer) the workpiece between and within the plurality of operation cells 12.

The tacking cell 20 may perform one or more machining and/or assembly operations (e.g., one or more tack fastening operations) on the unassembled workpiece 14 while positioned in the assembly position. The tacking cell 20 may utilize one or more fastening machines 78 to perform initial tack fastening of the unassembled workpiece 14. Tack fastening may be performed at one or more predetermined locations on the unassembled workpiece 14 while positioned in the assembly position to yield a workpiece in a partially assembled condition 30 (referred to generally as a partially assembled workpiece 30) (FIG. 2). For example, the assembly operations performed in the tacking cell 20 (e.g., by the fastening machines 78) may include, but are not limited to, preloading (e.g., clamping) the unassembled workpiece 14, drilling fasteners holes through the unassembled workpiece 14, coupling fasteners (e.g., tack fasteners) to the unassembled workpiece 14, setting fasteners and the like. As another example, the material-handling system 26 (e.g., the robotic assemblies 38) may preload (e.g., clamp) and hold the unassembled workpiece 14 while the fastening machines 78 drill fasteners holes through the unassembled workpiece 14, couple fasteners (e.g., tack fasteners) to the unassembled workpiece 14, set fasteners and the like.

Figure 8C:
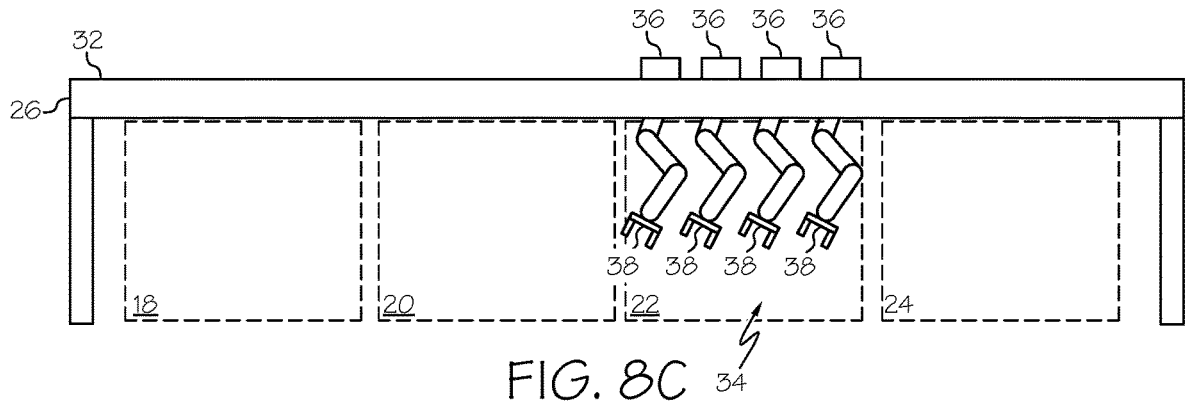

Upon completion of the assembly operations performed by the tacking cell 20, the robotic assemblies 38 may engage the partially assembled workpiece 30. The gantries 36 may move to a third position (e.g., positioning the robotic assemblies 38 within the functional operation area 34 of the fastening cell 22), as illustrated in FIG. 8C. The robotic assemblies 38 may transfer the partially assembled workpiece 30 to an appropriate assembly position within the fastening cell 22.

The fastening cell 22 may perform one or more assembly operations on the partially assembled workpiece 30 while positioned in the assembly position. The fastening cell 22 may utilize one or more fastening machines 78 to perform final fastening of the partially assembled workpiece 30. Final fastening may be performed at one or more predetermined locations on the partially assembled workpiece 30 while positioned in the assembly position to yield an assembled workpiece 16 (FIG. 2). For example, the assembly operations performed in the fastening cell 22 (e.g., by the fastening machines 78) may include, but are not limited to, preloading (e.g., clamping) the partially assembled workpiece 30, drilling fastener holes through the partially assembled workpiece 30, coupling fasteners to the partially assembled workpiece 30, setting fasteners, panel edge trimming, creating reference features for future operations and the like. As another example, the material-handling system 26 (e.g., the robotic assemblies 38) may preload (e.g., clamp) and hold the partially assembled workpiece 30 while the fastening machines 78 drill fasteners holes through the partially assembled workpiece 30, couple fasteners (e.g., tack fasteners) to the partially assembled workpiece 30, set fasteners, panel edge trimming, creating reference features for future operations and the like.

Figure 8D:
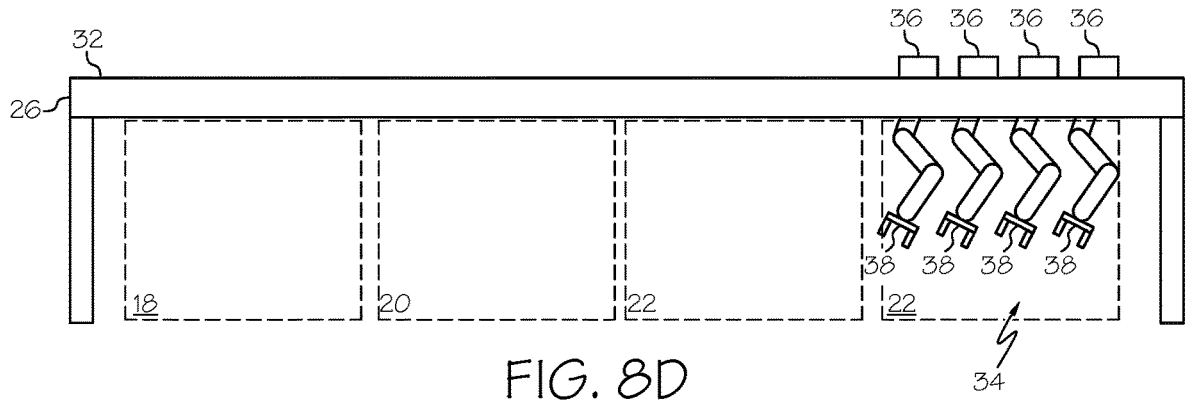

Upon completion of the assembly operations performed by the fastening cell 22, the robotic assemblies 38 may engage the assembled workpiece 16. The gantries 36 may move to a fourth position (e.g., positioning the robotic assemblies 38 within the functional operation area 34 of the extraction cell 24), as illustrated in FIG. 8D. The robotic assemblies 38 may transfer the assembled workpiece 16 to an unloading position within the extraction cell 24, for example, to be unloaded to the material-transport system 28. The assembly manufacturing operation illustrated in FIGS. 8A, 8B, 8C and 8D may be repeated to assemble additional assembled workpieces.

The tacking cell 20 may be configured to perform assembly operations similar to the fastening cell 22 (e.g., final fastening of the partially assembled workpiece 30) in situations where the fastening cell 22 is causing a lag in the assembly manufacturing operation.

Additionally, one or more of the robotic assemblies 38 of one or more gantries 36 may act as a buffer station and hold the partially assembled workpiece 30 and/or the assembled workpiece 16 while a subsequent assembly operation is being finished.

Those skilled in the art will recognize that the disclosed system 10 may include other configurations of the disclosed system 10 in order to optimize throughput of the assembly manufacturing operation. For example, a plurality of staging cells 18 may feed a tacking cell 20. As another example, a plurality of tacking cells 20 may feed a fastening cell 22. As another example, a tacking cell 20 may feed a plurality of fastening cells 22. As yet another example, a plurality of fastening cells 22 may feed an extraction cell 24.

Referring to FIG. 6, in an example embodiment, the material-transport system 28 may include a cart 72 to transport the unassembled workpiece 14 to, from and/or between one or more of the plurality of cells 12 (e.g., to the staging cell 20 and/or from the extraction cell 24). The cart 72 may be any carrying device suitable to hold and/or maintain the unassembled workpiece 14. The cart 72 may be customized to hold different types of unassembled workpiece 14. The cart 72 may be a manually guided cart (e.g., a push cart) or automatically guided cart.

In following with the aerospace example above, one configuration of the cart 72 may be configured to hold a plurality of stringers and at least one skin in a generally horizontal orientation such that the robotic assemblies 38 may transfer the unassembled workpiece 14 from the cart 72 upon entering the staging cell 18. Another configuration of the cart 72 may be configured to hold one or more assembled wing planks transferred to the cart 72 by the robotic assemblies 38 in a generally vertical orientation upon entering the extraction cell 24.

One or more carts 72 may be positioned within the staging cell 18 and/or the extraction cell 24 at any given point in the assembly manufacturing operation.

In an example implementation of the assembly manufacturing operation, a vehicle 74 may be utilized to transport the cart 72 to, from and/or between one or more of the plurality of cells 12. The vehicle 74 may be any mobile transport vehicle suitable to transport the cart 72. For example, the vehicle 74 may be a manually guided vehicle or an automated guided vehicle. In one example, the cart 72 may include a plurality of wheels and the vehicle 74 may drive (e.g., steer) the cart 72. In another example, the cart 72 may be carried by the vehicle 74. As a specific, non-limiting example, the vehicle 74 may be an omniMove mobile platform commercially available from KUKA Robotics Corporation of Gersthofen, Germany.

Referring to FIG. 5, the staging cell 18 and/or the extraction cell 24 may include one or more positioning systems 76. The positioning system 76 may define the predetermined position of the cart 72 and/or the vehicle 74 relative to the staging cell 18 such that the unassembled workpiece 14 are properly positioned for transfer from the cart 72 by the robotic assemblies 38. The positioning system 76 may also define the predetermined position of the cart 72 and/or the vehicle 74 relative to the extraction cell 24 such that the cart 72 is properly positioned for transfer of the assembled workpiece 16 from the extraction cell 24 by the robotic assemblies 38.

The positioning systems 76 may be any system suitable to properly and repeatably position the cart 72 and/or the vehicle 74 relative to one or more of the plurality of cells 12. The positioning system 76 may be configured to manual positioning of the cart 72 and/or the vehicle 74 or automatic positioning of the cart 72 and/or the vehicle 74. For example, the positioning systems 76 may include, but is not limited to, cup and cone locators, electronic positioning systems, physical stops and the like.

Those skilled in the art will recognize that the manner in which the unassembled workpiece 14 are loaded into the tacking cell 20 and/or the assembled workpiece 16 is unloaded from the fastening cell 22 may determine the need for the staging cell 18 and/or the extraction cell 24, respectively. For example, the unassembled workpiece 14 may be manually loaded into the tacking cell 20 and/or the assembled workpiece 16 may be manually unloaded from the fastening cell 22. As another example, the material-handling system 26 may be configured such that the tacking cell 20 transfers the unassembled workpiece 14 directly from the material-transport system 28 and/or the fastening cell 22 may be configured to transfer the assembled workpiece 16 directly to the material-transport system 28.

Referring to FIG. 5, the tacking cell 20 and the fastening cell 22 may include at least one fastening machine 78 and at least one tooling fixture 80. The tooling fixture 80 of the tacking cell 20 may be configured to support the unassembled workpiece 14 in the assembly position as placed by the robotic assemblies 38. The fastening machine 78 of the tacking cell 20 may be configured to prepare the unassembled workpiece 14 for tack fastening and install tack fasteners to the unassembled workpiece 14. The tooling fixture 80 of the fastening cell 22 may be configured to support the partially assembled workpiece 30 (FIG. 2) in the assembly position as placed by the robotic assemblies 38. The fastening machine 78 of the fastening cell 22 may be configured prepare the partially assembled workpiece 30 for final fastening and install final fasteners to the partially assembled workpiece 30.

Figure 9:
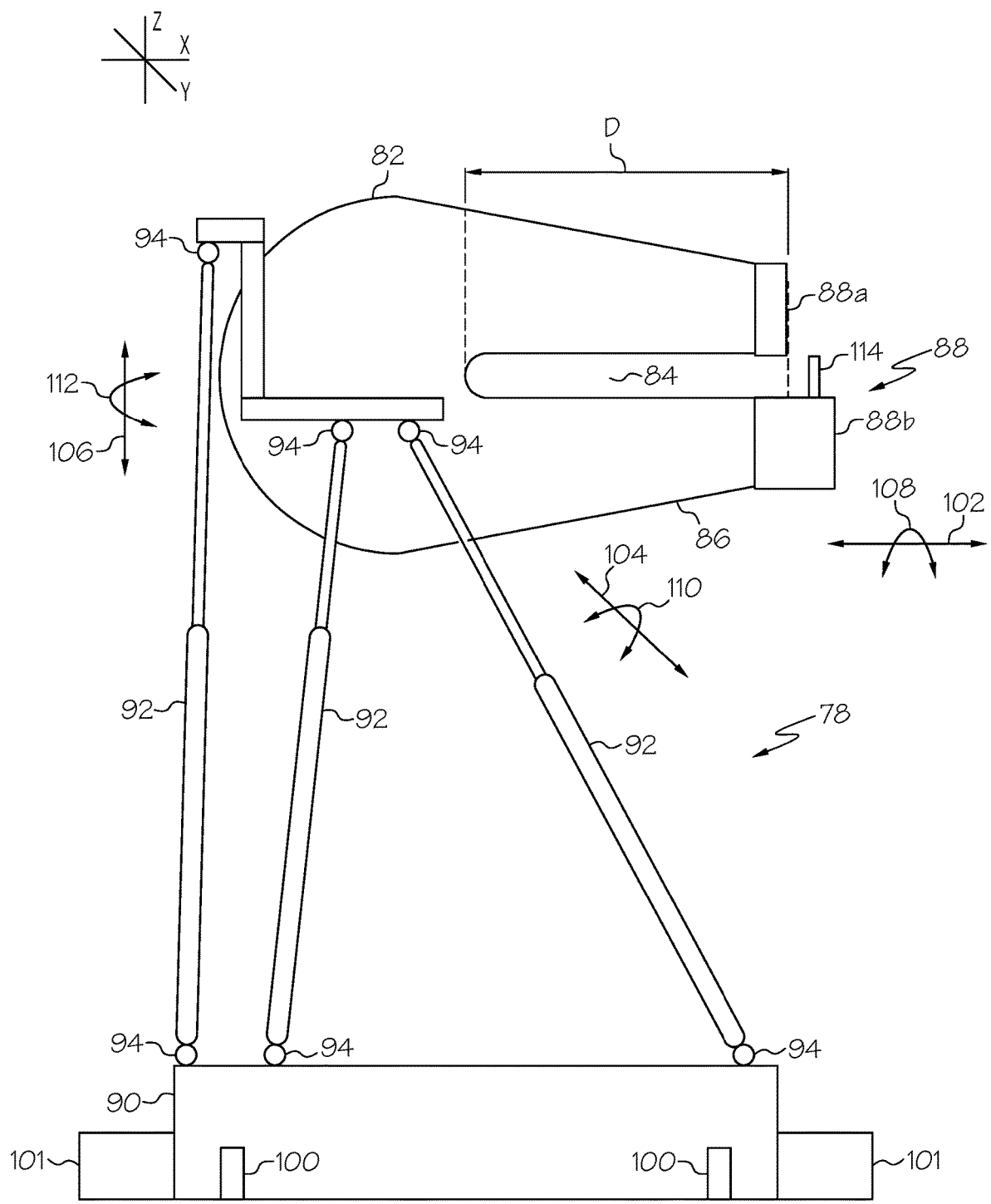
FIG. 9 is a schematic illustration of one embodiment of the fastening machine of the disclosed system.
Figure 11:
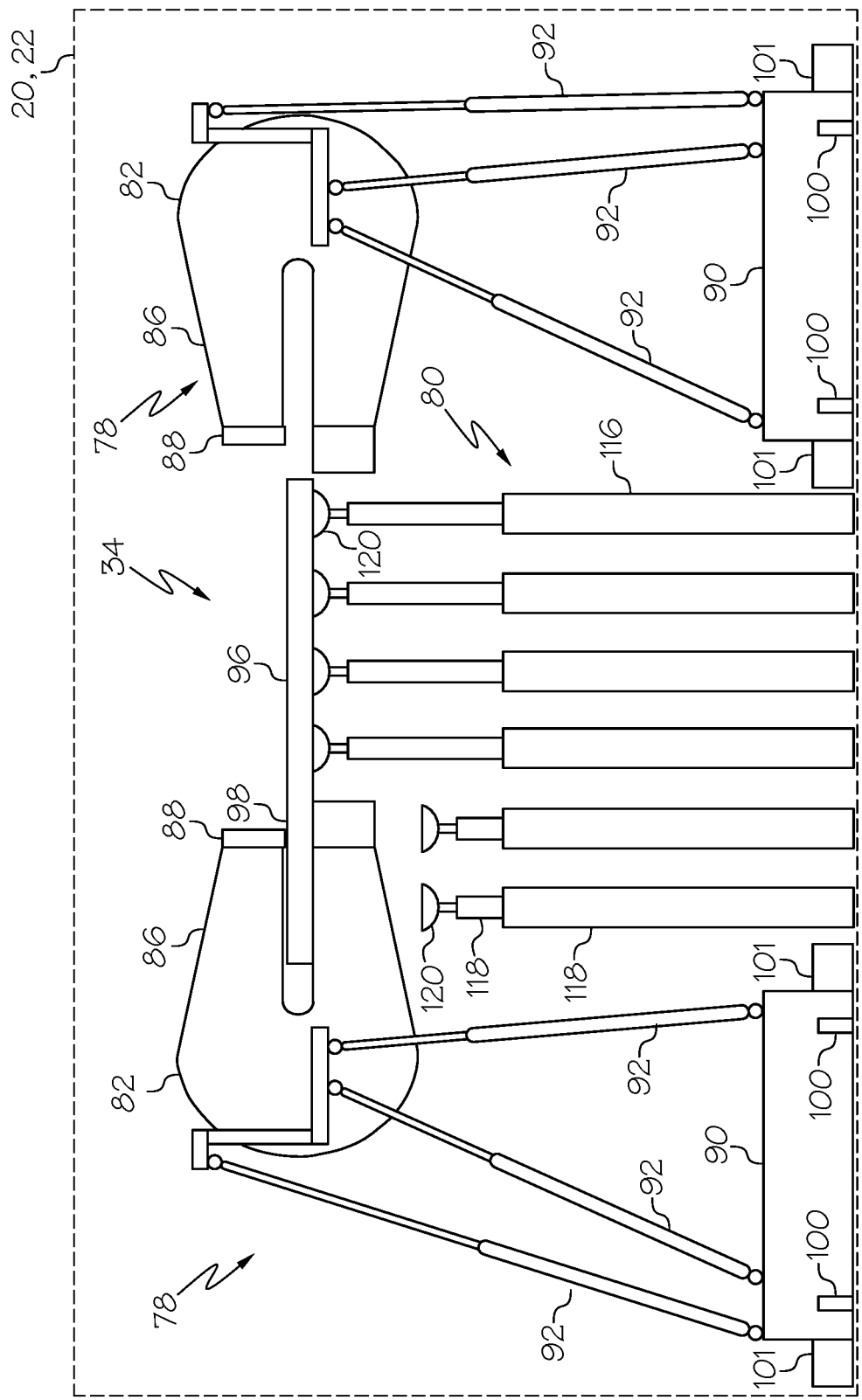
FIG. 11 is a schematic illustration of another embodiment of the operation cell.

Referring to FIG. 9, in an example embodiment, the fastening machine 78 may include a robot 82. The robot 82 may include a C-shaped frame 86 having a throat 84. An end effector 88 may be coupled to the robot 82 about an opening of the throat 84. The end effector 88 may include one or more machining and assembly devices 114 for performing one or more machining and/or assembly operations on a workpiece 96 (FIG. 11). As used herein, a workpiece 96 may include the unassembled workpiece 14 when used in relation to the tacking cell 20 or the partially assembled workpiece 30 when used in relation to the fastening cell 22 (FIG. 2). For example, the machining and/or assembly operations performed by the end effector 88 may include, but are not limited to, applying a preload, locating fastener locations, drilling fastener holes, aligning fastener holes, installing fasteners, setting fasteners, tightening fasteners, imaging, testing, inspecting and the like.

As a general, non-limiting example, the fastening method employed by the end effector 88 may include, but is not limited to, installing rivets, installing collars, installing clamps, installing bulk fasteners (e.g., nut and bolts), welding and the like. As a specific, non-limiting example, the tack fasteners and the final fasteners may be rivets. The machining and assembly device 114 may be configured to drill holes of various sizes to receive a range of different sizes of rivets, install appropriately sized rivets in associated holes and set the rivets (e.g., with up to 50,000 lbs. of force) to tack fasten the unassembled workpiece 14 together (e.g., when used in the tacking cell 20) and final fasten the partially assembled workpiece 30 together (e.g., when used in the fastening cell 22). In following with the aerospace example above, a plurality of robots 82 of the tacking cell 20 may install rivets to tack fasten the stringers to the skin section at approximately every 52 inches along the length of the plank. A plurality of robots 82 of the fastening cell 22 may install rivets to final fasten the stringers to the skin section at predetermined locations along the length of the wing plank.

The robot 82 may be horizontally mounted, for example, to a machine floor or ceiling or vertically mounted, for example, to a wall. In an example construction, the frame 86 may be coupled to a base 90. A plurality of actuators 92 may be connected between connection locations on the base 90 and connection locations on the frame 86 to position the frame 86 with respect to the base 90.

In an example construction, the base 90 may include at least one rail 100 and/or at least one rail 101. The base 90 may translate (e.g., linearly) along rail 100 and/or rail 101 to position the robot 82 relative to the workpiece (e.g., the unassembled workpiece 14 in the tacking cell 20 or the partially assembled workpiece 30 in the fastening cell 22). The base 90 may be driven upon rail 100 and/or rail 101 by any suitable driving system (not shown) including, but not limited to, a mechanical driving system, an electromechanical driving system, a hydraulic driving system, a pneumatic driving system or the like. In a specific, non-limiting example, the base 90 may be driven by and/or the relative position of the base with respect to the rails 100 may be controlled by one or more servomechanisms.

In another example construction, the fastening machine 78 may include one or more wheel assemblies (not shown) to position the robot 82 relative to the workpiece (e.g., the unassembled workpiece 14 in the tacking cell 20 or the partially assembled workpiece 30 in the fastening cell 22). For example, the base 90 may include wheel assemblies or the base 90 may be mounted to a wheeled cart or other mobile platform. The fastening machine 78 may be manually moved (e.g., wheeled) into position or may be automatically moved (e.g., driven) into position.

The actuators 92 may provide for movement of the frame 86 relative to the base 90 and a range of motion along length of the workpiece 96. The actuators 92 may be any device suitable to position the frame 86 in any of a plurality of discrete positions. For example, the actuators 92 may be hydraulic or pneumatic linear stroke actuators. In an example construction, two actuators 92 may be connected to opposing sides of the frame 86 proximate a front end, two actuators 92 may be connected to opposing sides of the frame 86 proximate a middle location of the frame 86 and two actuators may be connected proximate to a rear side of the frame 86. Each actuator 92 may be connected at each end by a freely movable joint 94 such that linear actuation of one or more actuators 92 may position the frame 86 (e.g., the location and angle of the throat 84 and the end effector 88) relative to a work surface 98 of the workpiece 96.

The actuators 92 may be configured to move and/or position the frame 86 (e.g., the throat 84 and the end effector 88) at any location, for example, in the direction of arrow 102 (e.g., along the X-axis), arrow 104 (e.g., along the Y-axis) and/or arrow 106 (e.g., along the Z-axis). The actuators 92 may be configured to rotate and/or position the frame 86 at any location, for example, in the direction of arrow 108 (e.g., about the X-axis), arrow 110 (e.g., about the Y-axis) and/or arrow 112 (e.g., about the Z-axis). In a specific, non-limiting example, the actuators 92 may be driven by and/or the relative position of the frame 86 with respect to each of the base 90 may be controlled by one or more servomechanisms.

Thus, the actuators 92 may provide the frame 86 with of freedom of movement along six axes (e.g., along the X-, Y- and/or Z-axis and about the X-, Y- and/or Z-axis) and the base 90 may provide the robot 82 with freedom of movement (e.g., linear movement) along a seventh axis (e.g., along the Y-axis) and/or an eighth axis (e.g., along the X-axis), for example, upon the rails 100, 101 or the wheel assemblies.

The end effector 88 may include an upper portion 88a and an opposed lower portion 88b. The upper portion 88a and the lower portion 88b of the end effector 88 may each be movable about the frame 86 (e.g., linearly) in order to apply a preload to (e.g., clamp) the work surfaces 98 of the workpiece 96 (FIG. 11) prior to performing a machining and/or assembly operation. For example, the upper portion 88a and the lower portion 88b of the end effector 88 may be configured to apply at least 1,000 lbs. of clamp force on the workpiece 96. The upper portion 88a and the lower portion 88b of the end effector 88 may be configured to apply an equal force to each side (e.g., opposed work surfaces 98) of the workpiece 96 such that the forces transferred to the base 90 are substantially limited or eliminated.

The throat 84 may be suitably sized to at least partially receive the workpiece 96. The throat 84 may include a throat depth D. The throat depth D may be of a depth sufficient to position the end effector 88 at any location over half the width of the largest applicable workpiece 96.

Figure 10:
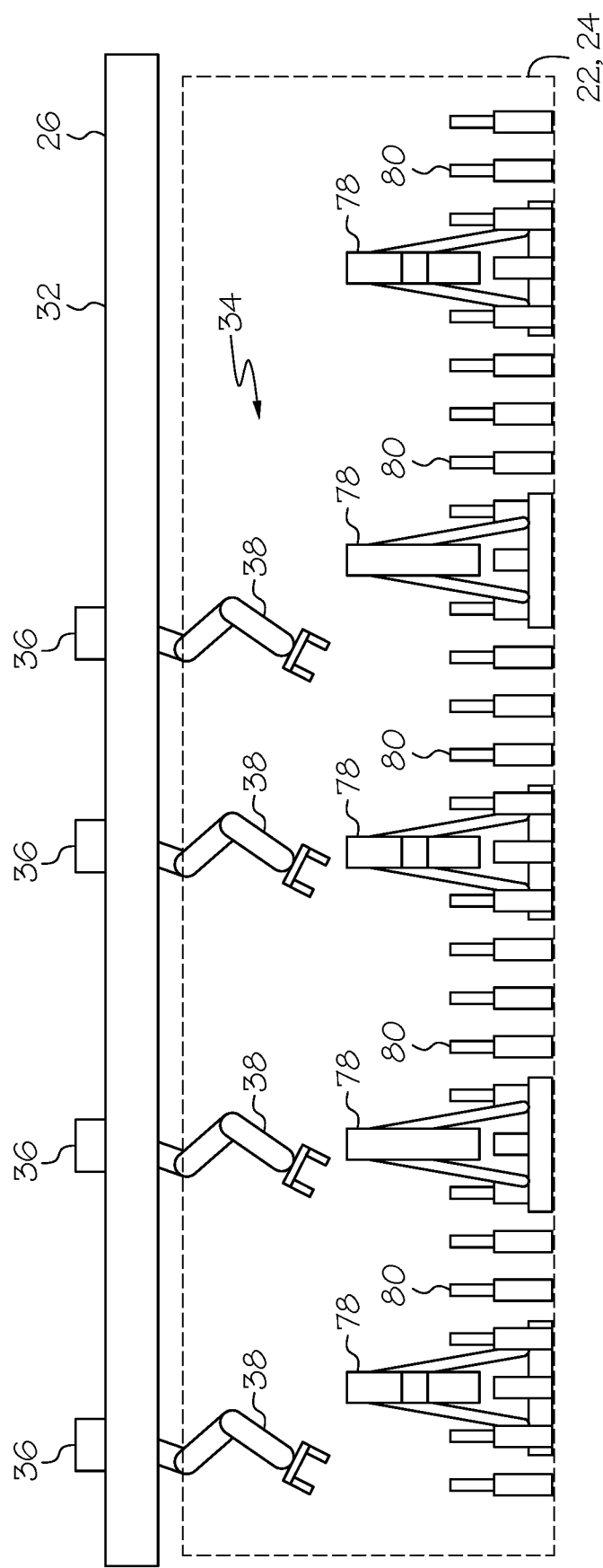
FIG. 10 is a schematic illustration of one embodiment of one operation cell of the disclosed system.

Referring to FIGS. 10 and 11, the tacking cell 20 and the fastening cell 22 may each include a plurality of fastening machines 78 and a plurality of tooling fixtures 80. For example, a plurality of fastening machines 78 may extend longitudinally along the length of the tacking cell 20 and the fastening cell 22, as illustrated in FIG. 10. The plurality of fastening machines 78 may be positioned on both sides of the tacking cell 20 and the fastening cell 22 (e.g., laterally opposed), as illustrated in FIG. 11. The plurality of laterally opposed fastening machine 78 may be offset (e.g., staggered), as illustrated in FIG. 10.

The plurality of tooling fixtures 80 may include any fixture suitable to support and/or hold the workpiece 96 (FIG. 11) in a substantially horizontal orientation such that the fastening machines 78 may perform one or more machining and/or assembly operation on the workpiece 96. While the workpiece 96 is illustrated as having substantially planar work surfaces 98, the fastening machines 78 may perform machining and/or assembly operations on workpieces 96 having non-planar, angled or contoured work surfaces 98. The actuators 92 may position the frame 86 such that the throat 84 (FIG. 9) may receive the workpiece 96 and the end effector 88 (e.g., the upper portion 88a and the lower portion 88b) (FIG. 9) may engage the work surfaces 98 at a substantially perpendicular working angle.

The plurality of tooling fixtures 80 may extend longitudinally along the length of the tacking cell 20 and the fastening cell 22, as illustrated in FIG. 10. The plurality of tooling fixtures 80 may be positioned between laterally opposed fastening machines 78, as illustrated in FIG. 11. The vertical position of each tooling fixture 80 relative to the workpiece 96 may be adjustable in order for one or more of the tooling fixtures 80 to move out of the way of one or more fastening machines 78. The horizontal position of each tooling fixture 80 relative to the fastening machines 78 (e.g., an adjacent fastening machine 78) may be adjustable in order to move out of the way of one or more fastening machines 78 and/or to minimize unsupported spans along the workpiece (e.g., the unassembled workpiece 14 in the tacking cell 20 or the partially assembled workpiece 30 in the fastening cell 22).

In an example construction, each tooling fixture 80 may include a vertically extendable and retractable stem 116. As one example, the tooling fixture retracts to provide access to the workpiece 96 by the fastening machine 78. As another example, the stem 116 may include two or more sections 118 that may be raised to support the workpiece 96 and/or lowered to allow the fastening machine 78 to access the workpiece 96. Each tooling fixture 80 may include a vacuum cup 120 at an end thereof to engage the workpiece 96. For example and as illustrated in FIG. 11, as the actuators 92 move and positioned the frame 86 of the robot 82 in position to receive the workpiece 96 within the throat 84 and between the end effector 88, one or more of the tooling fixtures 80 positioned in front of the fastening machine 78 may lower.

In following with the aerospace example above, in an example assembly manufacturing operation, the skin section may be positioned on the plurality of tooling fixtures 80 in the tacking cell 20 by the robotic assemblies 38. The skin section may be oriented such that the outer mold line (e.g., the exterior surface of the wing assembly) is in contact with the vacuum cups 120 and the inner mold line (e.g., the interior surface of the wing assembly) is in position for placement of the plurality of stringers by the robotic assemblies 38.

Referring to FIG. 5, in an example embodiment, the material-transport system 28, the material-handling system 26 and the plurality of operation cells 12 may be programmed to interact and perform the assembly machining operation automatically. The fastening machines 78 and the plurality of tooling fixtures 80 (e.g., of both the tacking cell 20 and the fastening cell 22) may operate synchronously with each other to perform the assembly machining operation automatically.

In an example implementation, the disclosed system 10 (e.g., the material-handling system 26, the tacking cell 20 and fastening cell 22) may automatically position of the workpiece at appropriate positions and/or locations between and within a particular operation cell 12 (e.g., the unassembled workpiece 14 in the tacking cell 20 or the partially assembled workpiece 30 in the fastening cell 22). As an example, the machine accuracy of the material-handling system 26 (e.g., the gantry 36 and the robotic assembly 38), the tacking cell 29 (e.g., the fastening machines 78 and the tooling fixtures 80) and the fastening cell 22 (e.g., the fastening machines 78 and tooling fixtures 80) may be sufficient to repeatably position the workpiece (e.g., the unassembled workpiece 14 in the tacking cell 20 or the partially assembled workpiece 30 in the fastening cell 22) such that no separate indexing or position verification may be needed.

In another example implementation, the disclosed system 10 (e.g., the material-handling system 26, the tacking cell 20 and fastening cell 22) may index and/or verify the position of the workpiece. As an example, the machine accuracy of the material-handling system 26 (e.g., the gantry 36 and the robotic assembly 38), the tacking cell 29 (e.g., the fastening machines 78 and the tooling fixtures 80) and the fastening cell 22 (e.g., the fastening machines 78 and tooling fixtures 80) may receive information and/or feedback from the metrology system 124. For example, the metrology system 124 may measure the position of the workpiece (e.g., the unassembled workpiece 14 on the material-transport system 28 in the staging cell 18, the unassembled workpiece 14 in the tacking cell 20, or the partially assembled workpiece 30 in the fastening cell 22) and/or the fastening machines 78 (e.g., of the tacking cell 20 and the fastening cell 22). The information and/or feedback may drive the components of the system 10 (e.g., the gantry 36, the robotic assembly 38, the fastening machines 78 and/or the tooling fixtures 80) to correct index positions.

As another example, the tacking cell 20 and/or fastening cell 22 may include sensors and/or machine vision systems (not shown) that detect critical features (e.g., existing pilot holes or edges) of the workpiece (e.g., the unassembled workpiece 14 in the tacking cell 20 or the partially assembled workpiece 30 in the fastening cell 22) that allows the components of the system 10 (e.g., the gantry 36, the robotic assembly 38, the fastening machines 78 and/or the tooling fixtures 80) to align correctly to the workpiece. As yet another example, the components of the system 10 (e.g., the gantry 36, the robotic assembly 38, the fastening machines 78 and/or the tooling fixtures 80) may be driven (e.g., automatically) to an accurate location and physically act as the index for the workpiece (e.g., the unassembled workpiece 14 in the tacking cell 20 or the partially assembled workpiece 30 in the fastening cell 22).

The disclosed system 10 may include at least one controller 122. The controller 122 may be associated with at least one of the material-handling system 26 (e.g., the gantry 36, the robot carriage 40, the robotic arm 42 and/or the end effector 44), the tacking cell 20 (e.g., the plurality of fastening machines 78 and/or the plurality of tooling fixtures 80), the fastening cell 22 (e.g., the plurality of fastening machines 78 and/or the plurality of tooling fixtures 80) and/or the material-transport system 28 (e.g., the vehicle 74).

The controller 122 may include any repeatable programming system, for example, to drive and position (1) the material-transport system 28 to predetermined positions with respect to the staging cell 18 and/or the extraction cell 24, (2) the material-handling system 26 (e.g., the gantries 36 and the robotic assemblies 38) to predetermined positions to transfer the unassembled workpiece 14 from the material-transport system 28 to the tacking cell 20, transfer the partially assembled workpiece 30 from the tacking cell 20 to the fastening cell 22, transfer the assembled workpiece 16 from the fastening cell 22 to the extraction cell 24 and transfer the assembled workpiece 16 from the extraction cell 24 to the material-transport system 28, (3) the fastening machines 78 to predetermined machining and/or assembly locations relative to the unassembled workpiece 14 (when in the assembly position) in the tacking cell 20, (4) the fastening machines 78 to predetermined machining and/or assembly locations relative to the partially assembled workpiece 30 (when in the assembly position) in the fastening cell 22 and (5) the plurality of tooling fixtures 80 to predetermined extended and/or retracted positions relative to the location of the fastening machines 78 (e.g., in both the tacking cell 20 and the fastening cell 22).

The controller 122 may be pre-programmed via a desktop computer, laptop computer, automation controller, industrial network control system, and the like. For example, the material-handling system 26 and the fastening machines 78 may include programmable industrial robots (e.g., the robotic assembly 38 and the robot 82) capable of learning (e.g., via programming and iterative instruction) positional data and iterative procedures. Metrology, navigation and/or factory-level control software may be implemented by the controller 122 and used coordinate the multiple automated and autonomous systems working in close proximity with residual manual operations. Additionally, the metrology system 124 may be used for locating, indexing, and quality-control functions.

Figure 12:
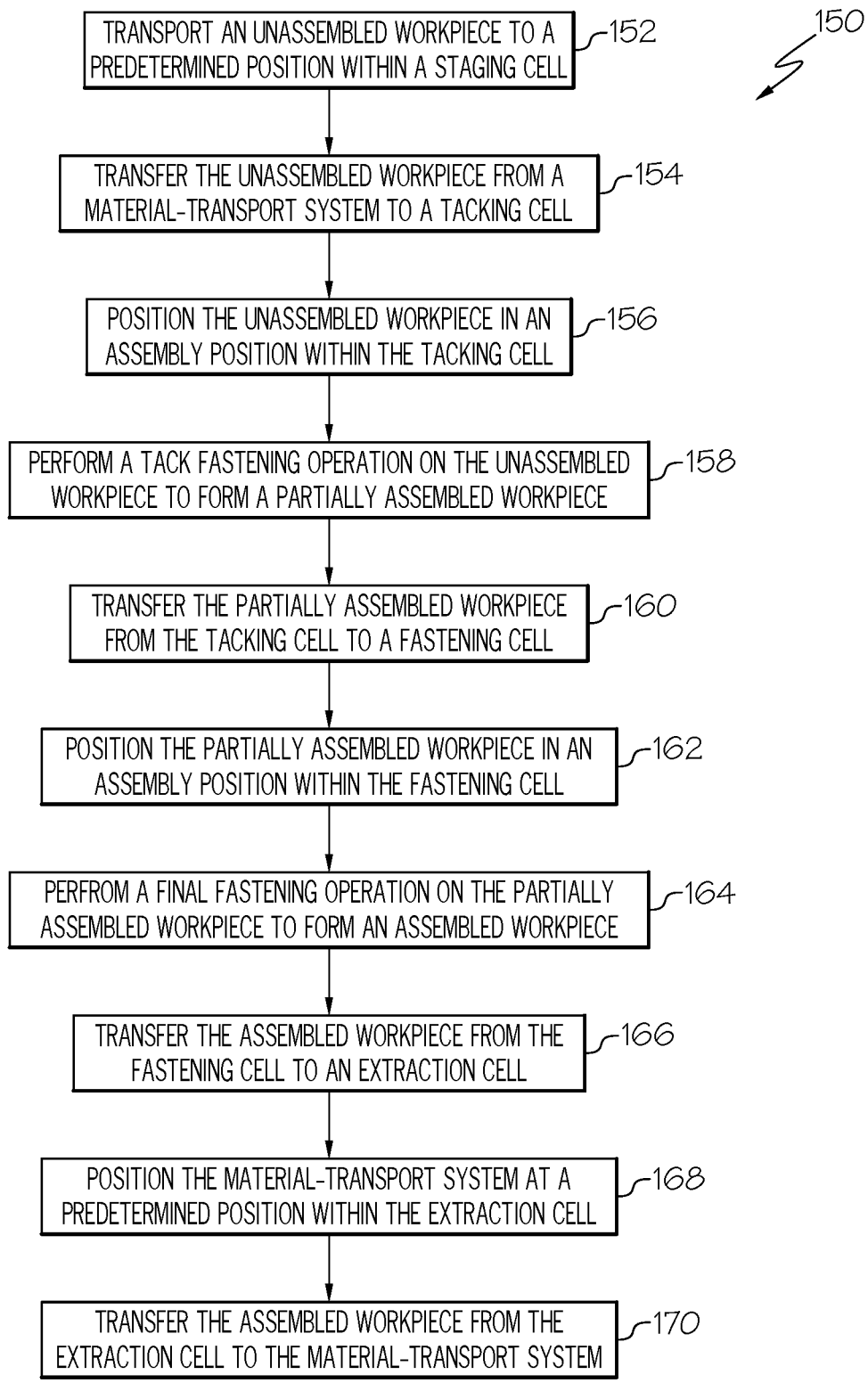
FIG. 12 is flow diagram of one embodiment of the disclosed method for assembly manufacturing.

Referring to FIG. 12, also disclosed is one embodiment of a method, generally designated 150, for assembly manufacturing. The method 150 may begin with the step of transporting, by a material-transport system, an unassembled workpiece to a predetermined position within a staging cell, as shown at block 152.

As shown at block 154, the unassembled workpiece may be transferred, by a material-handling system, from the material-transport system to a tacking cell.

As shown at block 156, the unassembled workpiece may be positioned, by the material-handling system, in an assembly position within the tacking cell.

As shown at block 158, at least one tack fastening operation may be performed, by a first plurality of fastening machines, on the unassembled workpiece to form a partially assembled workpiece. The tack fastening operation may include, but is not limited to, holding the unassembled workpiece, applying a preload to the unassembled workpiece, locating at least one fastening position on the unassembled workpiece and installing at least one tack fastener to the unassembled workpiece.

As shown at block 160, the partially assembled workpiece may be transferred, by the material-handling system, from the tacking cell to a fastening cell.

As shown at block 162, the partially assembled workpiece may be positioned, by the material-handling system, in an assembly position within the fastening cell.

As shown at block 164, at least one final fastening operation may be performed, by a second plurality of fastening machines, on the partially assembled workpiece to form an assembled workpiece. The final fastening operation may include, but is not limited to, holding the partially assembled workpiece, applying a preload to the partially assembled workpiece, locating at least one fastening position on the partially assembled workpiece and installing at least one final fastener to the partially assembled workpiece.

As shown at block 166, the assembled workpiece may be transferred, by the material-handling system, from the fastening cell to an extraction cell.

As shown at block 168, the material-transport system may be positioned at a predetermined location within the extraction cell.

As shown at block 170, the assembled workpiece may be transferred, by the material-handling system, from the extraction cell to the material-transport system.

Accordingly, the disclosure system and method includes a high-throughput, workpiece assembly system (e.g., large panel fastening system) with multiple operational cells for automatic (e.g., robotic) drilling, tacking and fastening. The disclosed system and method may include an array of automated technologies to reduce labor and tooling costs, as well as increase throughput and free space on a factory floor.

Figure 13:
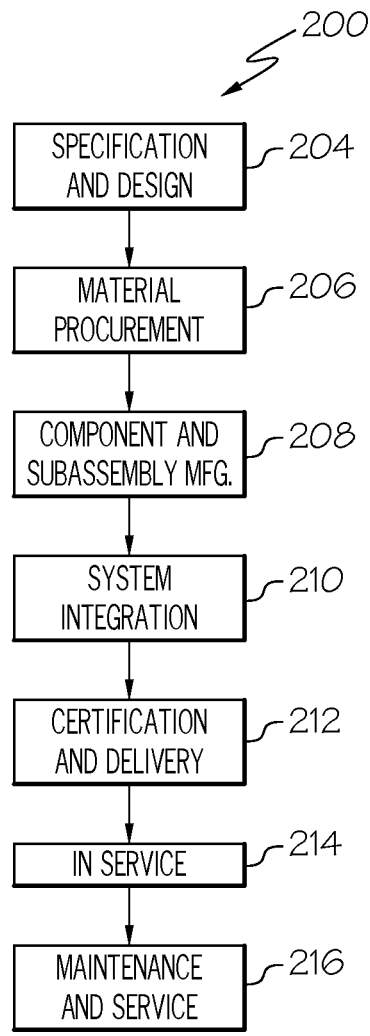
FIG. 13 is flow diagram of an aircraft production and service methodology.
Figure 14:
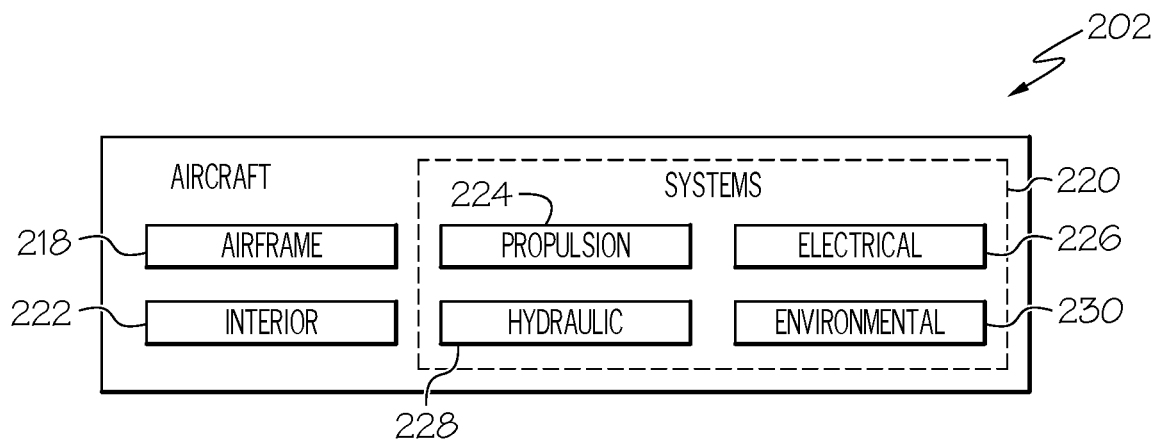
FIG. 14 is a block diagram of an aircraft.

Examples of the disclosure may be described in the context of an aircraft manufacturing and service method 200, as shown in FIG. 13, and an aircraft 202, as shown in FIG. 14. During pre-production, the aircraft manufacturing and service method 200 may include specification and design 204 of the aircraft 202 and material procurement 206. During production, component/subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216, which may also include modification, reconfiguration, refurbishment and the like.

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 14, the aircraft 202 produced by example method 200 may include an airframe 218 with a plurality of systems 220 and an interior 222. Examples of the plurality of systems 220 may include one or more of a propulsion system 224, an electrical system 226, a hydraulic system 228, and an environmental system 230. Any number of other systems may be included.

Apparatus and methods embodied herein may be employed during any one or more of the stages of the production and service method 200. For example, components or subassemblies corresponding to component/subassembly manufacturing 208, system integration 210, and or maintenance and service 216 may be fabricated or manufactured using the disclosed system 10 and method 150. Also, one or more apparatus examples, method examples, or a combination thereof may be utilized during component/subassembly manufacturing 208 and/or system integration 210, for example, by substantially expediting assembly of or reducing the cost of an aircraft 202, such as the airframe 218. Similarly, one or more of system examples, method examples, or a combination thereof may be utilized while the aircraft 202 is in service, for example and without limitation, to maintenance and service 216.

The disclosed system and method are described in the context of an aircraft; however, one of ordinary skill in the art will readily recognize the disclosed service system and may be utilized for a variety of different components for a variety of different types of vehicles. For example, implementations of the embodiments described herein may be implemented in any type of vehicle including, e.g., helicopters, passenger ships, automobiles and the like.

Although various embodiments of the disclosed system and method have been shown and described, modifications may occur to those skilled in the art upon reading the specification. The present application includes such modifications and is limited only by the scope of the claims.

What is claimed is:

1. A method for assembly manufacturing comprising:
    positioning a first workpiece-component and a second workpiece-component in a staging position within a first one of a plurality of operational cells, wherein said plurality of operational cells is arranged sequentially and is linked together by an overhead material-handling system that is shared by each one of said plurality of operational cells;
    moving said first workpiece-component from said first one of said plurality of operational cells to a first assembly position in a second one of said plurality of operational cells using said overhead material-handling system;
    moving said second workpiece-component from said first one of said plurality of operational cells to a second assembly position relative to said first workpiece-component using said overhead material-handling system;
    holding said second workpiece-component in said second assembly position using said overhead material-handling system;
    positioning a first fastening machine, located within said second one of said plurality of operational cells, relative to said first workpiece-component and said second workpiece-component;
    performing a first fastening operation to tack said first workpiece-component and said second workpiece-component together using said first fastening machine;
    moving said first workpiece-component and said second workpiece-component from said second one of said plurality of operational cells to a third assembly position in a third one of said plurality of operational cells using said overhead material-handling system;
    positioning a second fastening machine, located within said third one of said plurality of operational cells, relative to said first workpiece-component and said second workpiece-component; and performing a second fastening operation to fasten said first workpiece-component and said second workpiece-component together using said second fastening machine.

2. The method of claim 1 wherein:
said first fastening machine and said second fastening machine comprise:
a frame comprising a throat;
an assembly end effector coupled to said frame about said throat; and
a plurality of pairs of linear actuators coupled to three positions on said frame to position said frame with six degrees of freedom;
positioning said first fastening machine comprises selectively moving said frame of said first fastening machine about at least one of said six degrees of freedom using said plurality of pairs of linear actuators of said first fastening machine such that a portion of said first workpiece-component and a portion of said second workpiece-component are located within said throat of said first fastening machine and said assembly end effector of said first fastening machine is positioned for said first fastening operation; and
positioning said second fastening machine comprises selectively moving said frame of said second fastening machine about at least one of said six degrees of freedom using said plurality of pairs of linear actuators of said second fastening machine such that a portion of said first workpiece-component and a portion of said second workpiece-component are located within said throat of said second fastening machine and said assembly end effector of said second fastening machine is positioned for said second fastening operation.

3. The method of claim 2 wherein a first pair of said plurality of pairs of linear actuators is coupled to said frame proximate to a front end of said frame.

4. The method of claim 3 wherein a second pair of said plurality of pairs of linear actuators is coupled to said frame proximate to a middle of said frame.

5. The method of claim 4 wherein a third pair of said plurality of pairs of linear actuators is coupled to said frame proximate to a rear end of said frame.

6. The method of claim 2 further comprising:
supporting said first workpiece-component in said first assembly position using a first plurality of retractable tooling fixtures located within said second one of said plurality of operational cells; and
retracting at least one of said first plurality of retractable tooling fixtures to accommodate said frame of said first fastening machine in response to moving said frame of said first fastening machine.

7. The method of claim 6 wherein:
supporting said first workpiece-component in said first assembly position using said first plurality of retractable tooling fixtures comprises coupling a vacuum cup of each one of the said first plurality of retractable tooling fixtures to said first workpiece-component; and
retracting said at least one of said first plurality of retractable tooling fixtures comprises releasing said vacuum cup of said at least one of said first plurality of retractable tooling fixtures and retracting a multi-section stem of said at least one of said first plurality of retractable tooling fixtures relative to said first workpiece-component.

8. The method of claim 2 further comprising:
supporting said first workpiece-component and said second workpiece-component in said second assembly position using a second plurality of retractable tooling fixtures located within said third one of said plurality of operational cells; and
retracting at least one of said second plurality of retractable tooling fixtures to accommodate said frame of said second fastening machine in response to moving said frame of said second fastening machine.

9. The method of claim 1 wherein said first fastening operation comprises:
applying a preload to said first workpiece-component and said second workpiece-component;
locating a first fastening position; and
installing a tack fastener to said first workpiece-component and said second workpiece-component at said first fastening position.

10. The method of claim 1 further comprising:
moving said first workpiece-component and said second workpiece-component to said staging position within said first one of said plurality of operational cells using a material-transport system.

11. The method of claim 10 wherein said material-transport system comprises:
a vehicle; and
a cart coupled to said vehicle and configured to hold said workpiece.

12. The method of claim 11 wherein said vehicle is an automated guided vehicle.

13. The method of claim 12 further comprising automatically moving said vehicle to a predetermined position relative to said first one of said plurality of operational cells using a positioning system.

14. The method of claim 1 wherein:
said overhead material-handling system comprises:
a transfer rail positioned above said plurality of operational cells;
a robot carriage coupled to said transfer rail;
a robotic arm coupled to said robot carriage; and
a gripping end effector coupled to said robotic arm; and
moving said first workpiece-component to said first assembly position, moving said second workpiece-component to second assembly position, holding said second workpiece-component in said second assembly position, and moving said first workpiece-component and said second workpiece-component to said third assembly position comprises moving said robot carriage along said transfer rail and articulating said robotic arm to appropriately position said gripping end effector.

15. The method of claim 1 further comprising, with said first workpiece-component in said first assembly position and said second workpiece-component in said second assembly position:
positioning a third fastening machine, located within said second one of said plurality of operational cells opposite to said first fastening machine, relative to said first workpiece-component and said second workpiece-component; and
performing said first fastening operation to tack said first workpiece-component and said second workpiece-component together using said third fastening machine.

16. The method of claim 1 further comprising, with said first workpiece-component and said second workpiece-component in said third assembly position:
positioning a fourth fastening machine, located within said third one of said plurality of operational cells opposite to said second fastening machine, relative to said first workpiece-component and said second workpiece-component; and performing said second fastening operation to fasten said first workpiece-component and said second workpiece-component together using said fourth fastening machine.

17. The method of claim 1 wherein said second fastening operation comprises:

applying a preload to said first workpiece-component and said second workpiece-component;

locating a second fastening position; and installing a final fastener to said first workpiece-component and said second workpiece-component at said second fastening position.

18. The method of claim 1 further comprising indexing said second workpiece-component at said second assembly position relative to said first workpiece-component using a metrology system.

19. The method of claim 1 further comprising moving said first workpiece-component and said second workpiece-component from said third one of said plurality of operational cells to an extraction position in a fourth one of said plurality of operational cells using the overhead material-handling system.

20. The method of claim 1 wherein:

said first workpiece-component comprises a skin panel of a wing; and said second workpiece-component comprises a plurality of stringers of said wing;

moving said second workpiece-component comprises successively moving each one of said plurality of stringers to said second assembly position using said overhead material-handling system; and holding said second workpiece-component comprises holding each one of said stringers in said second assembly position while performing said first fastening operation to tack each one of said stringers and said skin panel together using said first fastening machine.

* * * * *